United States Patent
Whinnett et al.

(10) Patent No.: US 6,246,697 B1
(45) Date of Patent: Jun. 12, 2001

(54) METHOD AND SYSTEM FOR GENERATING A COMPLEX PSEUDONOISE SEQUENCE FOR PROCESSING A CODE DIVISION MULTIPLE ACCESS SIGNAL

(75) Inventors: Nicholas William Whinnett, Paris (FR); Kevin Michael Laird, Keller, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/012,927

(22) Filed: Jan. 24, 1998

(51) Int. Cl.[7] .................................................. H04J 1/00
(52) U.S. Cl. ............................... 370/479; 375/206
(58) Field of Search .................................... 370/342, 479, 370/350, 335, 441, 515, 516, 215; 375/205, 206, 208, 365, 367, 371

(56) References Cited

U.S. PATENT DOCUMENTS

| | | | |
|---|---|---|---|
| 4,774,715 | * | 9/1988 | Messenger . |
| 5,020,075 | * | 5/1991 | Tachika . |
| 5,440,597 | * | 8/1995 | Chung et al. ........................ 375/205 |
| 5,687,166 | * | 11/1997 | Natali et al. ........................ 370/209 |

* cited by examiner

*Primary Examiner*—Huy D. Vu
(74) *Attorney, Agent, or Firm*—L. Bruce Terry

(57) ABSTRACT

In a wireless communication system, a chip time is selected in a complex pseudonoise (PN) sequence generator. For a next chip time following the selected chip time, a phase difference between a previous complex PN chip and a next complex PN chip is restricted to a preselected phase angle. In one embodiment, every other chip time is selected and the preselected angle is 90 degrees.

16 Claims, 4 Drawing Sheets

METHOD AND SYSTEM FOR GENERATING A COMPLEX PSEUDONOISE SEQUENCE FOR PROCESSING A CODE DIVISION MULTIPLE ACCESS SIGNAL

FIELD OF THE INVENTION

The present invention is related in general to wireless communication systems, and more particularly to a method and system for processing code division multiple access signals with a complex pseudonoise sequence.

BACKGROUND OF THE INVENTION

In power amplifiers used to transmit modulated radio frequency signals, is desirable to operate with an input signal having a low peak-to-average ratio. Signals with high peak-to-average ratios are undesirable because the power amplifier produces extraneous side bands when a peaking signal causes it to operated in a nonlinear portion of its operating range. These extraneous side bands are produced by a mechanisms called AM-to-PM conversion and AM-to-AM conversion when passing a signal with large amplitude fluctuations. Furthermore, these side bands deprive the information signals of some of their portion of the transponder power, and also can interfere with nearby channels (adjacent channel interference).

In a communications system using quartenary phase shift keying (QPSK) the signal phase can be any of one of four phases for the duration of each phase shift interval. This is shown in the signal space diagram in FIG. 1, wherein phase 30 illustrates the phase of constellation point 32, which is one of the constellation points 32–38. Transitions 40–46 illustrate the permitted phase changes between phase shift intervals. A zero degree transition is shown at reference numeral 40. Examples of $\pi/2$ radians or 90° transitions are shown at reference numerals 42 and 44, and a 180° or $\pi$ radian transition is shown at reference numeral 46.

In a code division multiple access (CDMA) system, such as a CDMA system implemented according to American National Standards Institute (ANSI) J-STD-008, user data is spread and modulated by a pseudorandom noise (PN) sequence, which is periodic and has noise-like properties. For example, with reference to FIG. 2, in direct sequence QPSK transmitter 60, real-valued user data 62 is split and multiplied by 2 PN sequences: a $PN_I$ sequence 64 and a $PN_Q$ sequence 66, using multipliers 68 and 70, respectively. The PN sequences are generated by $PN_I$ and $PN_Q$ sequence generators 72 and 74, respectively. The duration of the output of these PN sequence generators may be referred to as a chip time or chip interval, which is the duration of a single pulse in a direct sequence modulated signal.

After in-phase (I) and quadrature (Q) components of user data 62 have been multiplied by $PN_I$ sequence 64 and $PN_Q$ sequence 66, the signals output by multipliers 68 and 70 are each separately filtered by pulse shaping filters 76. Pulse shaping filters 76 may be implemented with finite impulse response filters that filter higher frequency components from the signal.

Next, the filtered I and Q signal components are multiplied by quadrature carrier components 78 and 80 using multipliers 82 to produce I and Q radio frequency (RF) signals 84 and 86. Signals 84 and 86 are then added together in summer 88. The output of summer 88 is RF modulated signal 90, which is then amplified by power amplifier 92. The output of power amplifier 92 is then coupled to antenna 94 for transmitting the signal to a receiving unit.

As shown in FIG. 2, PN sequence generators 72 and 74 are typically implemented with a maximal-length linear feedback N-bit shift register, wherein selected stages are tapped and exclusive ORed with the shift register output to form a signal that is fedback to the shift register input. Other ways of implementing PN sequence generators may be used. For example, nonlinear feedback shift registers may be used to generate the PN sequences.

A combination of the outputs of $PN_I$ and $PN_Q$ generators 72 and 74 may be referred to as having a complex value that corresponds to a phase. For example, referring again to FIG. 1, if $PN_I$ equals 1 and $PN_Q$ equals 1 the complex PN value of (1, 1) corresponds to phase 30, which is $\pi/4$ radians. Other values output by the complex PN generator correspond to constellation points 34–38. Transitions 40–46 from one constellation point to another are determined by the difference between a previous complex PN chip and a next complex PN chip generated by the complex PN sequence generator in the next chip time.

When RF modulated signal 90 peaks and causes power amplifier 92 to operate in a non-linear region, extraneous side bands are created in the transmitted signal. These side band signals may be eliminated by reducing the occurrence of peaks in RF modulated signal 90, hence the desirability of reducing the peak-to-average ratio.

Peaks in RF modulated signal 90 occur as a result of receiving a sequence of chip values in pulse shaping filter 76 that highly correlates with the impulse response of pulse shaping filter 76. Furthermore, the peaking of signal 90 is greater when peaks are formed in pulse shaping filters 76 in both the I and Q channels at the same time.

In the prior art, $\pi/2$ BPSK modulation has been used to reduce the peak-to-average in signals sent to the power amplifier. However, $\pi/2$ BPSK modulation produces BPSK spreading, which is inferior because signals from other users are not easily rejected.

QPSK spreading, on the other hand, provides superior rejection between user's signals, but produces a signal with an inferior peak-to-average ratio. For a more detailed discussion regarding spreading methods, see the book "CDMA, Principles of Spread Spectrum Communications," by Andrew J. Viterbi, published by Addison Wesley in 1995, pages 26–32.

Thus, it should be apparent that a need exists for an improved method and system for generating a complex pseudonoise sequence for processing a code division multiple access signal wherein the complex pseudonoise sequence helps reduce the peak-to-average ratio of a modulated communications signal.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
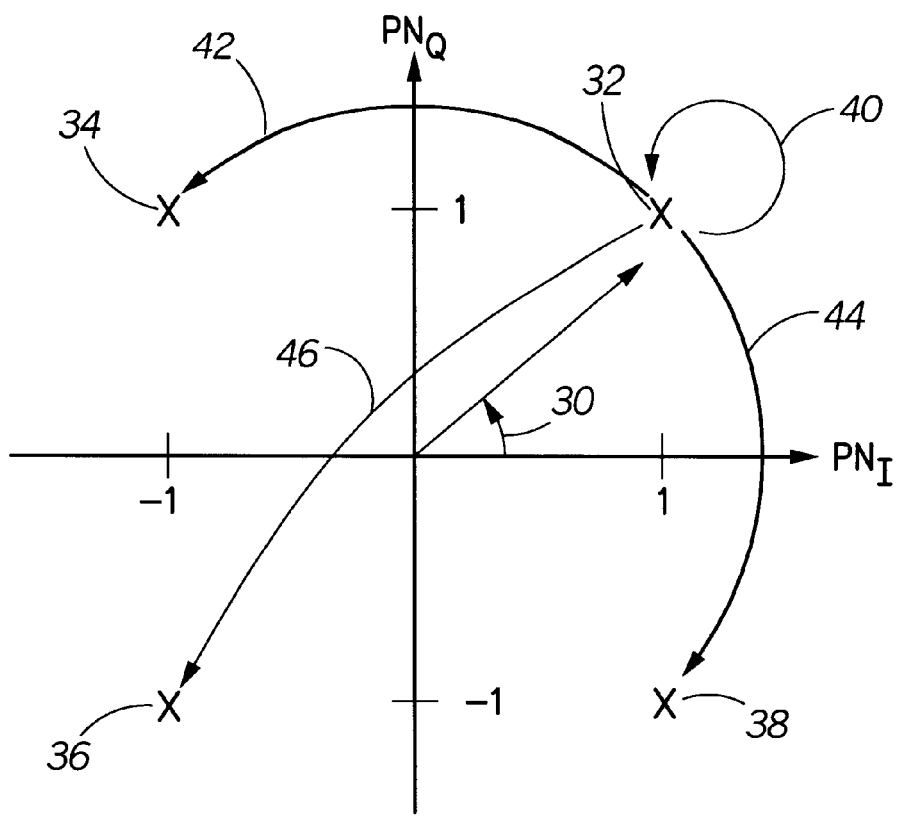
FIG. 1 depicts a QPSK signal space diagram according to the according to the prior art.
Figure 2:
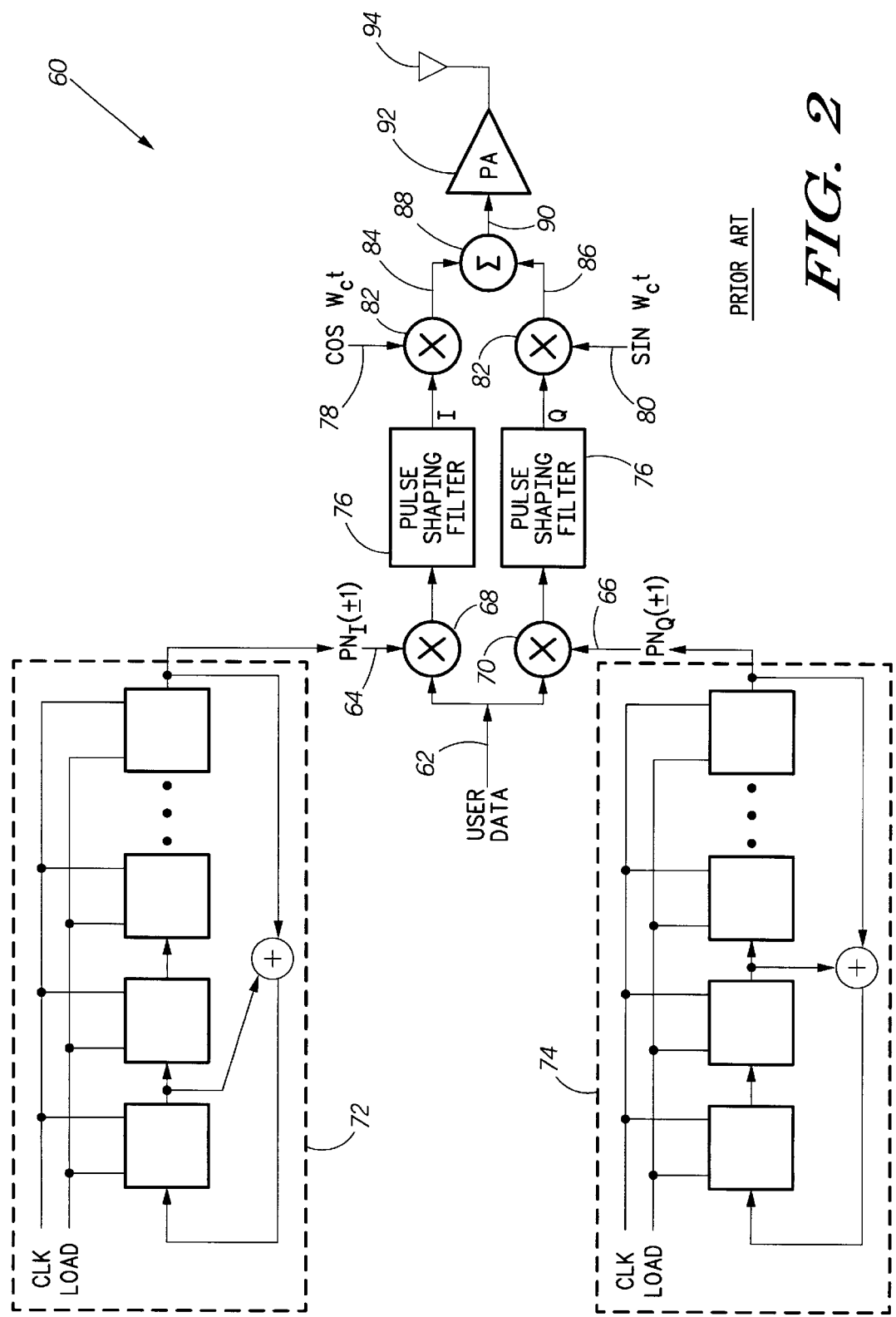
FIG. 2 is a direct sequence spread spectrum modulator in accordance with the method and system of the prior art.
Figure 3:
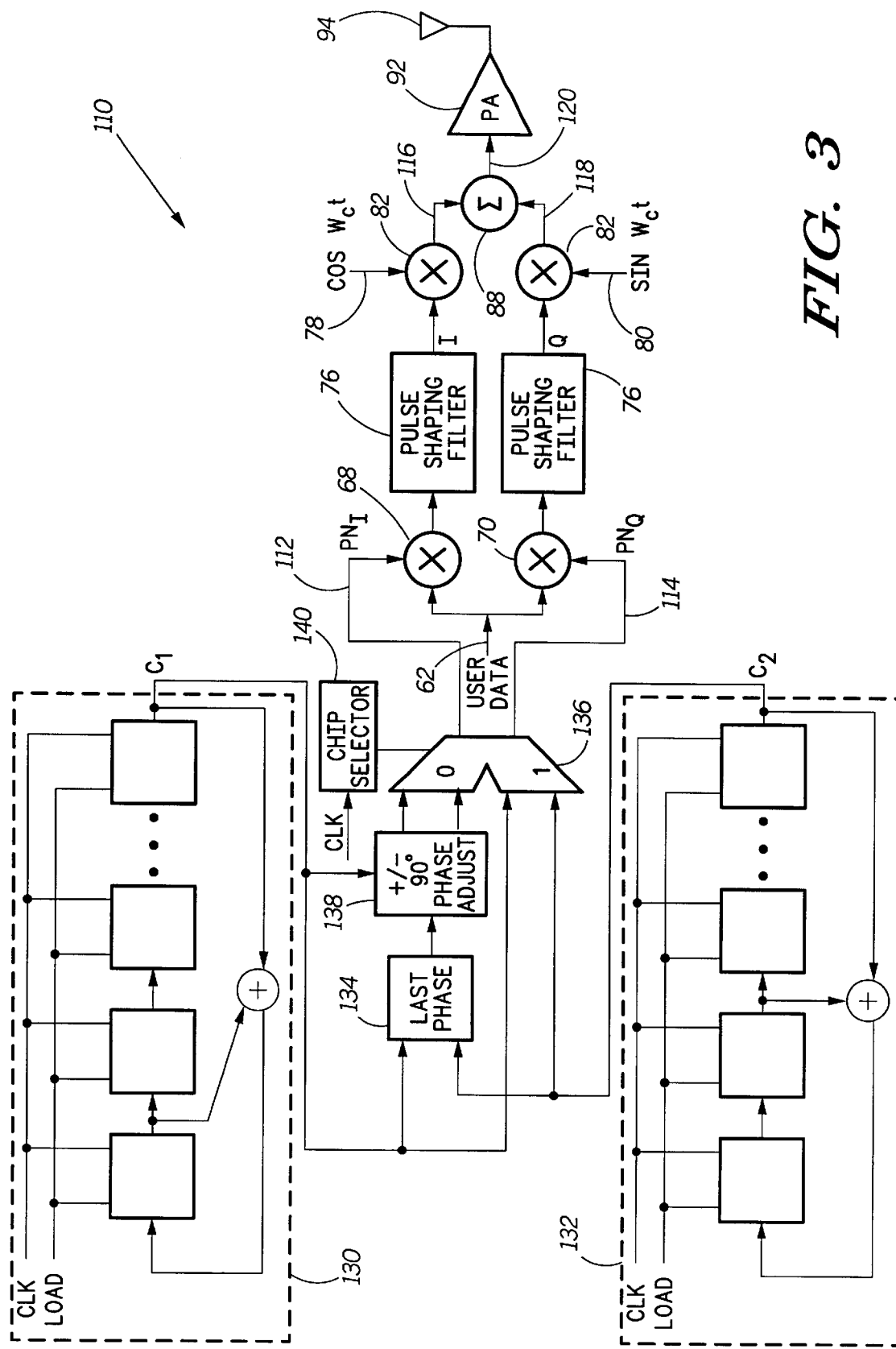
FIG. 3 is a direct sequence spread spectrum modulator incorporating a method and system for generating a complex pseudonoise sequence in accordance with the method and system of the present invention.

With reference now to the figures, and in particular with reference to FIG. 3, there is depicted a direct sequence spread spectrum transmitter incorporating the method and system for generating a complex pseudonoise sequence in accordance with the method and system of the present invention. As illustrated, direct sequence QPSK transmitter 110 receives real-valued user data 62, which is split and multiplied by two PN sequences generated according to the present invention. While generation of $PN_I$ and $PN_Q$ sequences 112 and 114 is new according to the present invention, many remaining portions of the transmitter operate in the manner discussed above. For example, multipliers 68 and 70 operate in much the same way as described with reference to FIG. 2. Similarly, pulse shaping filters 76 are used to filter high frequencies components from signals output from multipliers 68 and 70. The I and Q signals are then modulated in multipliers 82 by quadrature carrier components 78 and 80. I and Q RF signals 116 and 118 are added together in summer 88 to produce RF modulated signal 120, which is then amplified by power amplifier 92 and coupled to antenna 94 for transmitting the signal to a receiving unit. Note that signals 116, 118, and 120 are new because they are modified according to the present invention using the new complex PN sequence.

In a preferred embodiment, the generation of the improved complex pseudonoise sequence begins with $C_1$ and $C_2$ sequence generators 130 and 132, which may be implemented in much the same manner as $PN_I$ and $PN_Q$ sequence generators 72 and 74 shown in FIG. 2. The outputs of sequence generators 130 and 132 have values $C_1$ and $C_2$ during any given chip time. Signals $C_1$ and $C_2$ are both coupled to last phase register 134, and inputs to one side of multiplexer 136. Last phase register 134 converts the values of $C_1$ and $C_2$ into a phase angle and stores such a phase angle for one chip time.

Figure 4:
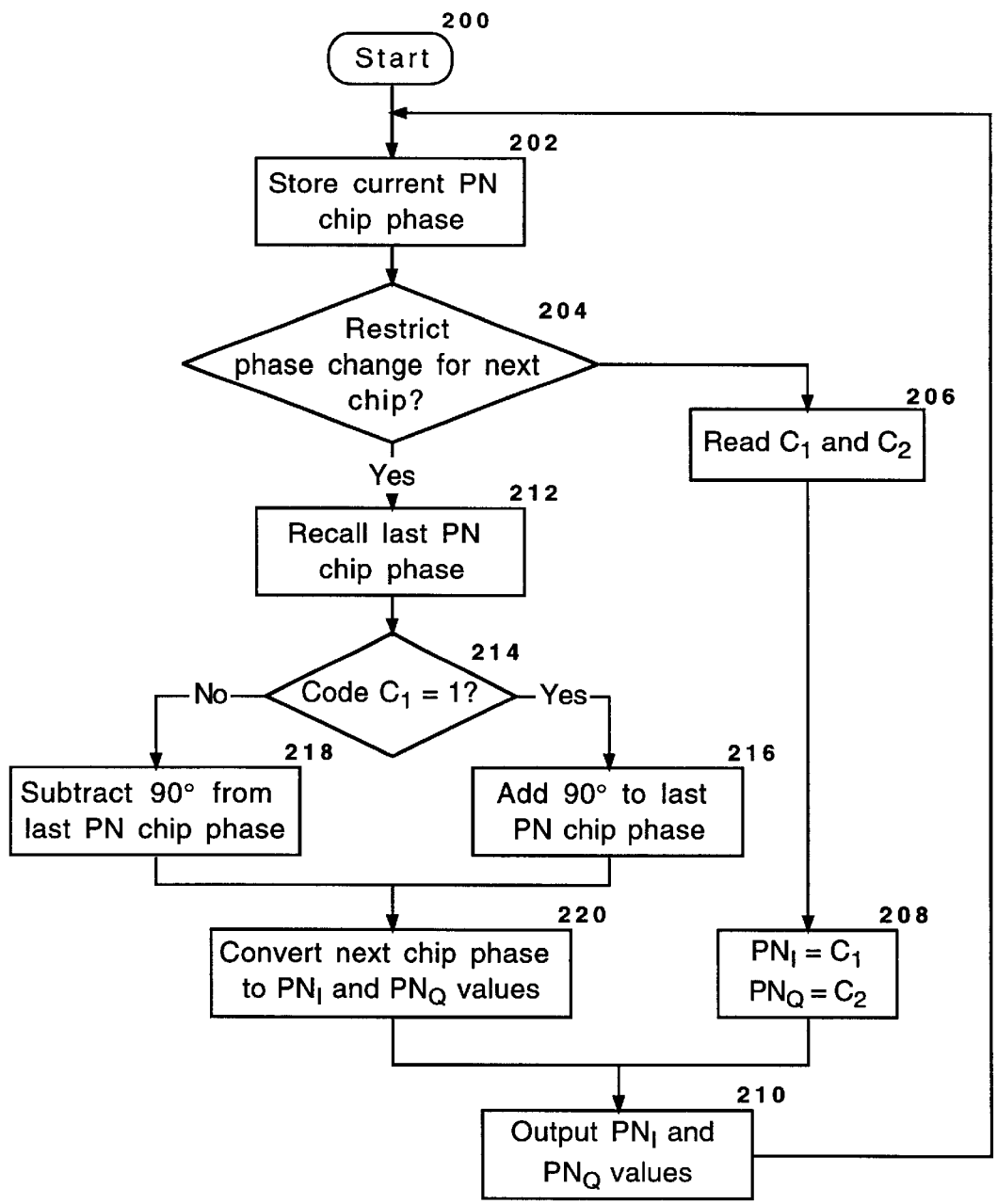
FIG. 4 is a high-level logic flowchart which illustrates the method and system of generating a complex pseudonoise sequence according to the present invention.

Last phase information output from last phase register 134 is coupled to phase adjuster 138, which also receives the current chip value of $C_1$ from $PN_I$ sequence generator 130. As shown in FIG. 4, phase adjuster 138 is a ±90 degree phase adjuster wherein the determination of whether to add or subtract 90 degrees depends upon the current value of $C_1$. In one implementation of phase adjuster 138, the sign of either $C_1$ or $C_2$, which are inferred from the phase input from last phase register 134, is changed depending upon whether the current value of $C_1$ is a +1 or a −1. Phase adding or phase subtracting in phase adjuster 138 may be controlled according to any sequence that may be determined or preset in the receiver.

The outputs of phase adjuster 138, $PN_I$ and $PN_Q$, are coupled to inputs of multiplexer 136, as shown.

The values output from multiplexer 136 are selected from the pairs of inputs based upon a signal from chip selector 140. Chip selector 140 is clocked by a clock signal that is common to both $PN_I$ sequence generator 130 and $PN_Q$ sequence generator 132, wherein the period of the clock is a chip time. In a preferred embodiment, chip selector 140 causes multiplexer 136 to select the output of phase adjuster 138 during every other chip time. When the output of phase adjuster 138 is not selected, the unmodified, current values of $C_1$ and $C_2$ are output from multiplexer 136. Thus, in the preferred embodiment, at every other chip time, the phase of the next complex PN chip differs from the phase of the previous complex PN chip by 90 degrees.

$PN_I$ and $PN_Q$ sequences 112 and 114, which are the outputs of multiplexer 136, are coupled to multipliers 68 and 70, respectively, and are thereby used to process or spread a code division multiple access signal that carries user data 62.

With reference now to FIG. 4, there is depicted a high-level logic flowchart that illustrates the method of generating a complex pseudonoise sequence according to the present invention. As illustrated, the process begins at block 200 and thereafter passes to block 202 wherein the process stores a current PN chip phase. This may be implemented by converting the current values of $C_1$ and $C_2$ to a phase, wherein $C_1$ and $C_2$ have values of +/−1.

Next, the process determines whether or not a phase change for a next chip should be restricted to a predetermined angle, as depicted at block 204. If the next chip is not selected as a chip for which the phase change will be restricted, the process reads $C_1$ and $C_2$ from the outputs of the complex PN sequence generator, as illustrated at block 206. The process then equates $PN_I$ with $C_1$ and $PN_Q$ with $C_2$, as illustrated at block 208. Finally, the process outputs the $PN_I$ and $PN_Q$ values, as depicted at block 210. Because the process had not selected this chip time to restrict the phase change of the next PN chip, the $PN_I$ and $PN_Q$ values are output as the next PN chip without modification.

With reference again to block 204, if the next chip is selected for restricting the phase change, the process recalls the last PN chip phase, as illustrated at block 212. Next, the process examines code $C_1$ and determines whether or not it is equal to 1, as depicted at block 214. If $C_1$ is equal to 1, the process adds 90 degrees to the last PN chip phase to compute the next PN chip phase, as illustrated at block 216. However, if code 1 is not equal to 1, the process subtracts 90 degrees from the last PN chip phase to compute the next PN chip phase, as depicted at block 218.

After adding or subtracting 90 degrees from the last PN chip phase to compute the next PN chip phase, the process converts the next PN chip phase to $PN_I$ and $PN_Q$ values, as illustrated at block 220. Thereafter, the $PN_I$ and $PN_Q$ values are output, as depicted at block 210. The process then iteratively returns to block 202, wherein the current PN chip phase is stored.

While the present invention generates a complex PN sequence used to process or spread a CDMA signal in a transmitter, this method and system for generating the complex PN sequence must also be used in a receiving unit to process or despread the received CDMA signal. Therefore, those persons skilled in the art should recognize that CDMA receivers must also practice the method and system of the present invention.

The present invention has been described in reference to a system that transmits real user data 62. Persons skilled in the art should recognize that user data may be complex data and that multipliers 68 and 70 may be implemented in a complex manner.

Those persons skilled in the art should recognize that the spreading scheme that uses the complex PN generator of the present invention is neither a QPSK spreading scheme nor a π/2 BPSK spreading scheme; the spreading scheme produced by using the present invention is a hybrid wherein selected chip times behave like a π/2 BPSK spreading scheme and the remaining chip times behave like a QPSK spreading scheme. This hybrid spreading scheme avoids the low interference rejection of the π/2 BPSK spreading and avoids the high peak-to-average ratio of the QPSK spreading.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

We claim:

1. A method in a wireless communication system for generating a complex pseudonoise (PN) sequence for processing a code division multiple access signal, the method comprising the steps of:

selecting a chip time in a complex PN sequence generator; and at each selected chip time, restricting a phase difference between a previous complex PN chip and a next complex PN chip to a preselected phase angle.

2. The method for generating a complex pseudonoise sequence according to claim 1 wherein the step of selecting a chip time in a complex PN sequence generator further includes periodically selecting every Nth chip time in a complex PN sequence generator.

3. The method for generating a complex pseudonoise sequence according to claim 2 wherein N equals 2 for selecting every other chip time in the complex PN sequence generator.

4. The method for generating a complex pseudonoise sequence according to claim 1 wherein the step of restricting a phase difference between a previous complex PN chip and a next complex PN chip to a preselected phase angle further includes restricting a phase difference between a previous complex PN chip and a next complex PN chip to 90°.

5. The method for generating a complex pseudonoise sequence according to claim 1 wherein the step of restricting a phase difference between a previous complex PN chip and a next complex PN chip to a preselected phase angle further includes adding 90° or subtracting 90° from a phase of a previous complex PN chip to produce a next complex PN chip.

6. The method for generating a complex pseudonoise sequence according to claim 5 wherein the step of adding 90° to or subtracting 90° from a phase of a previous complex PN chip to produce a next complex PN chip further includes adding 90° to or subtracting 90° from a phase of a previous complex PN chip in response to a value of a previous complex chip to produce a next complex PN chip.

7. The method for generating a complex pseudonoise sequence according to claim 5 wherein the step of adding 90° to or subtracting 90° from a phase of a previous complex PN chip to produce a next complex PN chip further includes adding 90° to or subtracting 90° from a phase of a previous complex PN chip according to a preselected sequence to produce a next complex PN chip.

8. The method for generating a complex pseudonoise sequence according to claim 1 wherein the step of periodically selecting a chip time in a complex PN sequence generator further includes periodically selecting N chip times within a series of M consecutive chip times in a complex PN sequence generator.

9. A system in a wireless communication system for generating a complex pseudonoise (PN) sequence for processing a code division multiple access signal, the system comprising:

means for selecting a chip time in a complex PN sequence generator; and means for restricting a phase difference between a previous complex PN chip and a next complex PN chip to a preselected phase angle at each selected chip time.

10. The system for generating a complex pseudonoise sequence according to claim 9 wherein the means for selecting a chip time in a complex PN sequence generator further includes means for periodically selecting every Nth chip time in a complex PN sequence generator.

11. The system for generating a complex pseudonoise sequence according to claim 10 wherein N equals 2 for selecting every other chip time in the complex PN sequence generator.

12. The system for generating a complex pseudonoise sequence according to claim 9 wherein the means for restricting a phase difference between a previous complex PN chip and a next complex PN chip to a preselected phase angle further includes means for restricting a phase difference between a previous complex PN chip and a next complex PN chip to 90°.

13. The system for generating a complex pseudonoise sequence according to claim 9 wherein the means for restricting a phase difference between a previous complex PN chip and a next complex PN chip to a preselected phase angle further includes means for adding 90° to or subtracting 90° from a phase of a previous complex PN chip to produce a next complex PN chip.

14. The system for generating a complex pseudonoise sequence according to claim 13 wherein the means for adding 90° to or subtracting 90° from a phase of a previous complex PN chip to produce a next complex PN chip further includes means for adding 90° to or subtracting 90° from a phase of a previous complex PN chip in response to a value of a previous complex chip to produce a next complex PN chip.

15. The system for generating a complex pseudonoise sequence according to claim 13 wherein the means for adding 90° to or subtracting 90° from a phase of a previous complex PN chip to produce a next complex PN chip further includes means for adding 90° to or subtracting 90° from a phase of a previous complex PN chip according to a preselected sequence to produce a next complex PN chip.

16. The system for generating a complex pseudonoise sequence according to claim 9 wherein the means for periodically selecting a chip time in a complex PN sequence generator further includes means for periodically selecting N chip times within a series of M consecutive chip times in a complex PN sequence generator.

* * * * *